United States Patent [19]

McElroy

[11] Patent Number: 4,649,091
[45] Date of Patent: Mar. 10, 1987

[54] FUEL CELL BATTERY WITH IMPROVED MEMBRANE COOLING

[75] Inventor: James F. McElroy, Hamilton, Mass.

[73] Assignee: United Technologies Corporation, Hartford, Conn.

[21] Appl. No.: 576,675

[22] Filed: Feb. 3, 1984

Related U.S. Application Data

[62] Division of Ser. No. 391,800, Jun. 23, 1982, abandoned.

[51] Int. Cl.[4] .................. H01M 2/00; H01M 8/04
[52] U.S. Cl. ................................ 429/34; 429/26; 429/120; 429/129; 65/169; 165/104.33
[58] Field of Search .............. 429/11, 20, 26, 34, 429/120, 124, 247; 165/169, 104.33

[56] References Cited

U.S. PATENT DOCUMENTS 3,432,357 3/1969 Dankese .................... 429/34
3,507,702 4/1970 Sanderson ................ 429/24
3,516,867 6/1970 Dankese .................... 429/26

Primary Examiner—Brian E. Hearn
Assistant Examiner—Stephen J. Kalafut
Attorney, Agent, or Firm—Alan C. Cohen

[57] ABSTRACT

A membrane fuel cell battery is described which is characterized by improved reactant flow distribution and heat removal. Internally cooled, bipolar, reactant flow defining assemblies separate the ion exchange membranes of adjacent cells. Coolant flow through the interior of the separator is controlled to cool one side more than the other. The cooler side of one separator contacts the fuel side of a membrane while the warmer side of the adjacent separator contacts the oxidant side. The temperature differential across the membrane minimizes drying of the fuel side of the hydrated cell membranes.

2 Claims, 6 Drawing Figures

FUEL CELL BATTERY WITH IMPROVED MEMBRANE COOLING

This application is a division of application Ser. No. 391,800, filed June 23, 1982, now abandoned.

The instant invention relates to a fuel cell battery and, more particularly, one containing internally cooled bipolar separator elements between fuel cells.

For purposes of simplifying the description, the invention will be described in the context of an $H_x/O_2$ fuel cell in which the fuel is hydrogen and the oxidant is pure oxygen or an oxygen-containing air stream. It will be understood, however, that the invention is applicable to any fuel cell whatever the reactants, as for example, $H_2/Cl_2$, $H_2/Br_2$, etc. fuel cells.

Electrochemical fuel cells which generate power through the electrochemical reaction of a fuel such as hydrogen, and an oxidant, such as oxygen, at the surface of catalytic electrodes separated by an ion transporting membrane are well known. Fuel cell batteries in which a plurality of cells are connected in series by means of bipolar plates which separate the individual cells are also well known. One such fuel cell battery is illustrated in U.S. Pat. No. 3,134,696, assigned to the General Electric Company, the assignee of the present invention, and discloses a battery in which each cell includes a hydrated ion exchange membrane having particulate catalytic electrodes bonded to opposite surface of the membrane. Conductive, bipolar separators contact the fuel (anode) and oxidant (cathode) electrodes attached to the membranes of adjacent cells. Each conductive, bipolar element consists of a conductive plate having conductive projections on opposite sides thereof. The projections contact the electrodes of adjacent cells to allow anode and cathode current flow in the cells. The projections also establish parallel flow paths for the fuel and oxidant gases over the surface of the electrodes bonded to the membranes.

The terms anode and cathode are utilized in their electrochemical sense in that reduction by the addition of electrons takes place at the cathode whereas oxidation by loss of electrons occurs at the anode.

U.S. Pat. No. 4,175,165 shows a fuel cell battery comprising a plurality of membrane cells with the membranes of adjacent cells separated by bipolar, fluid distributing elements which are a bonded aggregate of graphite and polymeric binder particles. Each side of the bipolar graphite plate contains a plurality of parallel grooves which define the flow channels for the fuel and oxidant gases with the grooves on opposite sides of the bipolar plate being at right angles to each other.

The bipolar elements of the prior art as illustrated in the two above-identified patents, are, however, large and bulky. A need therefore exists for a a fuel battery in which the bipolar and fluid flow distributing elements are lightweight and very thin, in order to maximize the number of cells in the battery for a given weight and volume.

Heat removal from a fuel cell battery is a critical aspect of fuel cell battery design. Heat generated in the cell as a result of the electrochemical reactions, if not rapidly removed, extracts water from the hydrated ion exchanging membranes. As the membranes lose water of hydration, their resistance increases and the performance of the cells at any given current density deteriorate.

Various arrangements have been proposed for removing heat from the cells. Heat sinks, control of the thermal impedance of reactant passages, and other structures are typical examples of prior art schemes for enhancing heat removal. U.S. Pat. No. 3,392,058, assigned to the General Electric Company, the assignee of the present invention, is typical of such a prior art arrangement in which heat transfer plates are positioned adjacent to the oxidant side of the cell to remove heat and minimize drying of the membrane. However, these prior art arrangements while, to some extent, facilitating heat removal have added bulk, weight and cost to the cell and battery.

Dehydration of the cell membranes due to heat produced by the electrochemical reactions is but one aspect of the problem. A more subtle and perhaps more difficult aspect of the problem is membrane drying due to the ionic current flow itself. That is, as hydrogen is oxidized on the fuel side and the $H^+$ cations (protons) are transported across the membrane, each proton carries several molecules of membrane water with it. In fact, one proton may transport as many as eight (8) to ten (10) molecules of water so that on a mole-to-mole or mole per Faraday basis 8 to 10 moles of water are transported for each mole of hydrogen oxidized at the anode electrode. Consequently, there is a strong tendency for the hydrogen side of the membrane to dry out. This drying phenomenon is aggravated as the battery power output, and hence the cell current density, increases. In fact, fuel side membrane drying may be an important limiting factor in the power output capabilities of a fuel cell battery of any fixed number of cells.

In an attempt to overcome membrane drying the incoming fuel gas is customarily humidified to provide water to rehydrate the hydrogen side of the membrane. However, humidification of the fuel gas is only a partial solution since the amount of water which can be entrained in the fuel gas stream, without iteself affecting cell operation, is limited. That is, with too much water vapor in the incoming fuel gas, a water film forms over the anode preventing the hydrogen from reaching the electrode. Thus, while the proton transport across the membrane may result in 8 to 10 moles of $H_2O$/Faraday being extracted from the memmbrane, a much lower quantity of make up water can be supplied by the humidified reactant stream.

Applicant has found that drying of the hydrogen side of the membrane may be substantially reduced, even at high cell current densities and high battery power output, by cooling the hydrogen side of the membrane sufficiently to establish a temperature gradient which causes back migration of water from the cathode to the anode side to alleviate drying. This highly desirable result is preferably achieved by the use of a unique, internally cooled, fluid distributing, bipolar separator positioned between membranes of adjacent cells. The coolant separator is characterized by the fact that the coolant flowing through its interior is controlled in such a manner that the side contacting the hydrogen electrode is cooler than the side which contacts the oxygen electrode attached to the membrane of the adjacent fuel cell. Thus the membrane in a fuel cell is in contact with the cooler side of one bipolar separator and the warmer side of the adjacent bipolar separator thereby maintaining a temperature differential across the membrane with the $H_2$ side cooler than $O_2$ side.

Each bipolar separator has an internal coolant chamber which contains a coolant flow insert shaped to produce dynamic fluid flow on one side and a more restricted, or static, flow on the other side, thereby producing different cooling rates (i.e. differential cooling) on opposite sides of the chamber.

The bipolar, coolant separator assembly is a sealed unit with thin, metallic reactant flow field defining foils or plates supported on a frame. This construction allows fabrication of very thin, bipolar, separator, coolant assemblies which have obvious advantages in reducing the size and weight of the fuel cell battery. This is particularly notable as compared to arrangements of bipolar fluid distributing elements of the type illustrated in Patent #4,175,165, referred to previously, in which the assembly is a bulky agglomerate of graphite and polymeric binder particles.

It is therefore a primary objective of the instant invention to provide a fuel cell battery of the membrane type capable of continuous operation at greater cell current densities and power outputs than prior membrane type of fuel cell batteries.

Another objective of the invention is to provide a fuel cell battery of the membrane type in which effective temperature control is achieved to minimize membrane drying on the fuel gas side.

Still another objective of the invention is to provide an improved bipolar, separator coolant element for a fuel cell battery to achieve controlled cooling of the cell membrane.

A further objective of the invention is to provide a fuel cell battery in which effective control of the moisture content of the membrane on the fuel side of a cell is readily effected by controlled cooling of opposite sides of the membrane.

Yet another objective of the invention is to provide a fuel cell battery in which size and weight for any power output is minimized. Other objectives and advantages of the invention will become apparent as the description thereof proceeds.

The various objectives are realized in a fuel cell battery which comprises a plurality of cells each of which includes a hydrated cation transporting, membrane having electrodes bonded to opposite sides thereof. The membranes are separated by internally cooled, bipolar separators. The separators define reactant flow fields for the individual cells, extract heat, and connect the cells in series. One side of each bipolar assembly, and a membrane and associated electrode, defines the anode chamber of a cell. The other side of the assembly along with the adjacent membrane and electrode, defines the cathode chamber of the adjacent cell.

The novel features which are believed to be characteristic of this invention are set forth in the appended claims. The invention itself, however, both as to its organization and mode of operation, together with further objectives and advantages thereof, may best be understood by reference to the following description taken in connection with the accompanying drawings in which:

Figure 1:
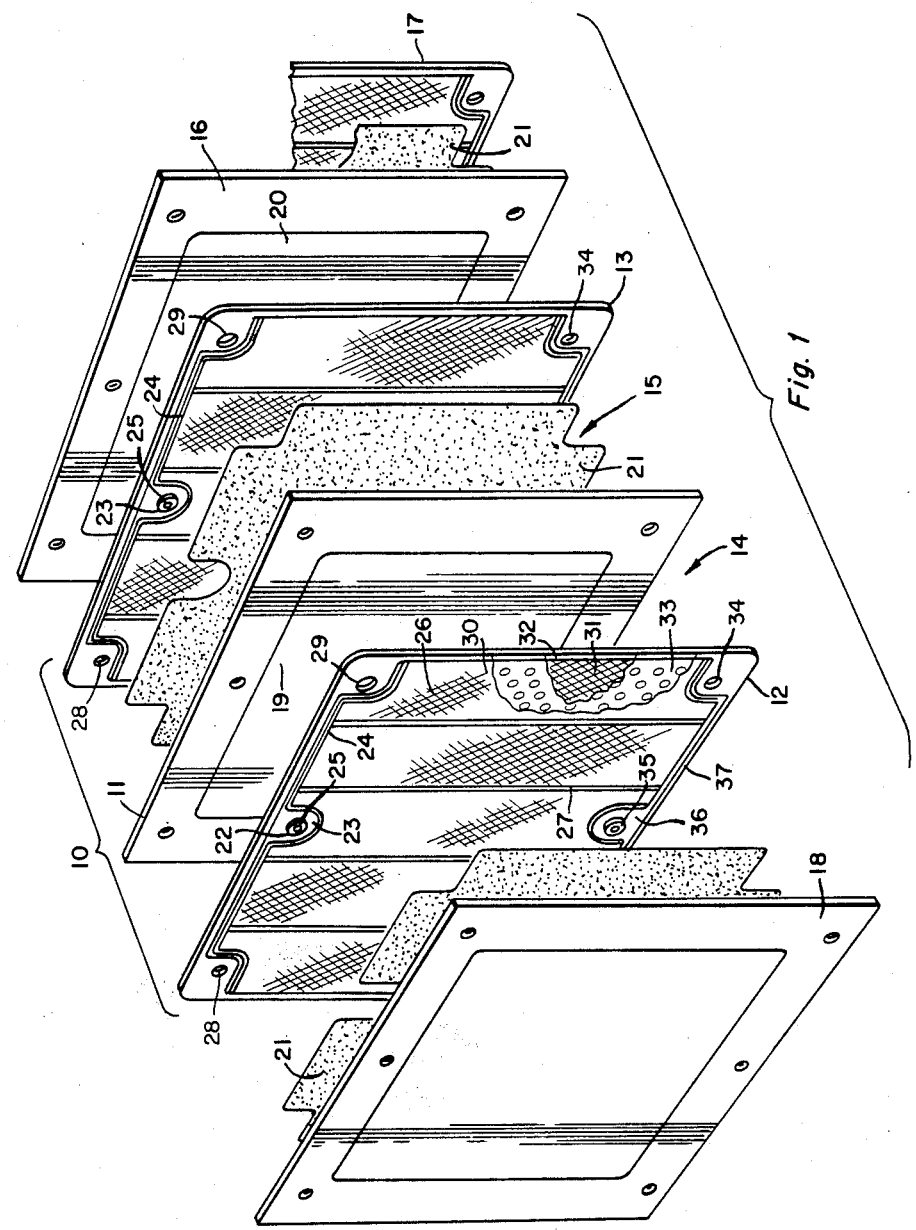
FIG. 1 is an exploded view showing several cells of a fuel cell battery incorporating the invention.

FIG. 1 is an exploded view of two series connected fuel cells forming part of a larger battery and shows the novel internally cooled, bipolar, reactant flow field defining, separators. The battery includes a first fuel cell 10, which includes a cation exchanging membrane 11 positioned between internally cooled bipolar separators 12 and 13. The next adjacent cell consists of membrane 16 positioned between bipolar separators 13 and 17. Membrane 18 is positioned between separator 12 and the next adjacent separator, not shown, and forms part of yet another cell in the battery. In fuel cell 10 an anode electrode 19, comprising a liquid and gas pervious bonded aggregate of catalytic and polymeric binder particles, is attached to one surface of the membrane. Membrane 11, anode 19, and one side of separator 12 form an anode chamber 14. A conductive support member, not shown for the sake of clarity, is positioned between anode 19 and the back side of separator 12. Its principal purpose is to prevent deformation of the membrane by the projections on the separator which define the anode flow field. A cathode, not shown, bonded to the other side of membrane 11, and separator 13 form cathode chamber 15. In a similar fashion, separator 13, one side of membrane 16 and separator 17 and the other side of membrane 16 form the anode and cathode chamber of the cell to the right of cell 10. Hydrogen is oxidized at anode 14 releasing electrons to the external load circuit, not shown. Hydrogen ions (H+) produced by oxidation of hydrogen gas are transported through the membrane to the liquid and gas pervious cathode, not shown, attached to the opposite side of the membrane. Oxygen is introduced into cathode chamber 15 and reacts with electrons flowing to the cathode to reduce the hydrogen ions and form product water.

Product water, if not removed promptly, can form a water film over the cathode which blocks oxygen from the electrode and hinders or terminates the cathode reaction. To prevent such "flooding" of the cathode a porous, wet-proofed, current conducting carbon sheet 21 is positioned between the cathode and $O_2$ flow field defining surface of separator 13.

Sheet 21 is approximately 10-12 mils. thick, and is fabricated of carbon and a hydrophobic polymeric binder such as polytetrafluoroethylene which is commercially available from DuPont under its trade designation Teflon. The hydrophobic Teflon binder, causes product water to "bead" so that formation of a water film is prevented and oxygen can diffuse through the pores of the cathode. Product water formed at the cathode can move through porous sheet 21 without flooding the pores. Reference is herewith made to U.S. Pat. No. 4,215,183, assigned to General Electric the assignee of the present invention, which describes such a wet-proofed carbon paper current collecting element as well as a manner for producing the same. The wet-proofed carbon paper layer 21, is preferably bonded to the cathode and membrane surface by the application of heat and pressure so as to form a unitary multilayer assembly.

A cylindrical oxygen inlet manifold 22, as seen most clearly on separator 12, is located in a well 23 at the top of the separators. Manifold 22 communicates with an oxygen flow channel 24 extending across the top of the separator. Passages in manifold 22 communicate with an oxygen inlet bore 25. Oxygen from bore 25 flows into well 23 along channel 24 and then downwardly over the surface of the separator which includes a plurality of projections or dimples 26 which define the flow field. A plurality of spacer ridges 27, which extend above projections 26, define a plurality of flow fields for the oxidant. The flowing oxygen contacts the wet-proofed current conductor and the cathode bonded to membrane 11 in cathode chamber 15. Bipolar separators 12 and 13 also contain hydrogen inlets 28, which introduce hydrogen into anode chamber 14. Coolant inlet and outlet manifolds 29 and 38 in each of the separators allows flow of coolant water through the interior coolant chamber of bipolar separator 12 and 13.

As may be more readily seen in the broken away section of the side of bipolar separator 12, the separator consists of an embossed cathode side flow field plate/30, a dimpled or embossed anode side plate 31 supported by a rectangular frame 32. The frame may be metallic, i.e., such as niobium, or may be a non-conductive material such as polysulfon. The combination of frame 32 and plates 30 and 31 defines an interior coolant chamber. A dimpled coolant flow field insert 33 is positioned within the chamber and produces different coolant flow rates on opposite sides of the chamber so that the anode plate is cooled to a greater extent than the cathode plate. The anode side a cell membrane is thus maintained at a lower temperature than the cathode side. This results in back diffusion of water from the cathode to the anode side of the membrane, thereby compensating for anode side drying due to removal of membrane water of hydration by the ionic current.

Suitable openings in the non-active membrane border are aligned with the coolant, $H_2$ and $O_2$ flow manifolds. The non-active membrane border is covered with a silicone adhesive and the membranes and separators are clamped together by suitable metallic endplates, not shown. Valved inlet conduits in the endplates communicate with the fuel, oxidant and coolant manifolds to permit flow of the gases into the individual cell chambers and of coolant into the bipolar separators.

The membranes are preferably perfluorosulfonic cation exchange membranes of the type sold by the DuPont Company under its tradename Nafion. Such membranes have a fluorocarbon backbone with sulfonic acid functional groups attached to the backbone which act as the ion exchanging sites.

The electrodes are preferably bonded agglomerates of catalytic platinum group metal and polymeric binder particles. The catalytic particles may be platinum black or particles of other platinum group metals or oxides of platinum group metals. The polymeric binder is preferably a hydrophobic binder such as polytetrafluoroethylene. A mixture of the catalytic and polymeric binder particles is placed in a thin titanium foil and one side of the membrane is placed over the mixture on the foil. The particles are bonded to each other and to the membrane to form a gas and liquid pervious electrode by the appliation of heat and pressure for a period of 3 to 5 minutes. The pressure is not crucial and can be in the range of 400–1000 psi, with 800 psi being preferred. The temperature is also not crucial and may vary from 200° to 600° C. with the preferred upper end of the range being at least that temperature at which the polymeric binder particles are sintered together with the catalytic particles. The lower end of the temperature range is roughly around 250° C., at that temperature where adhesion becomes questionable.

Figure 2:
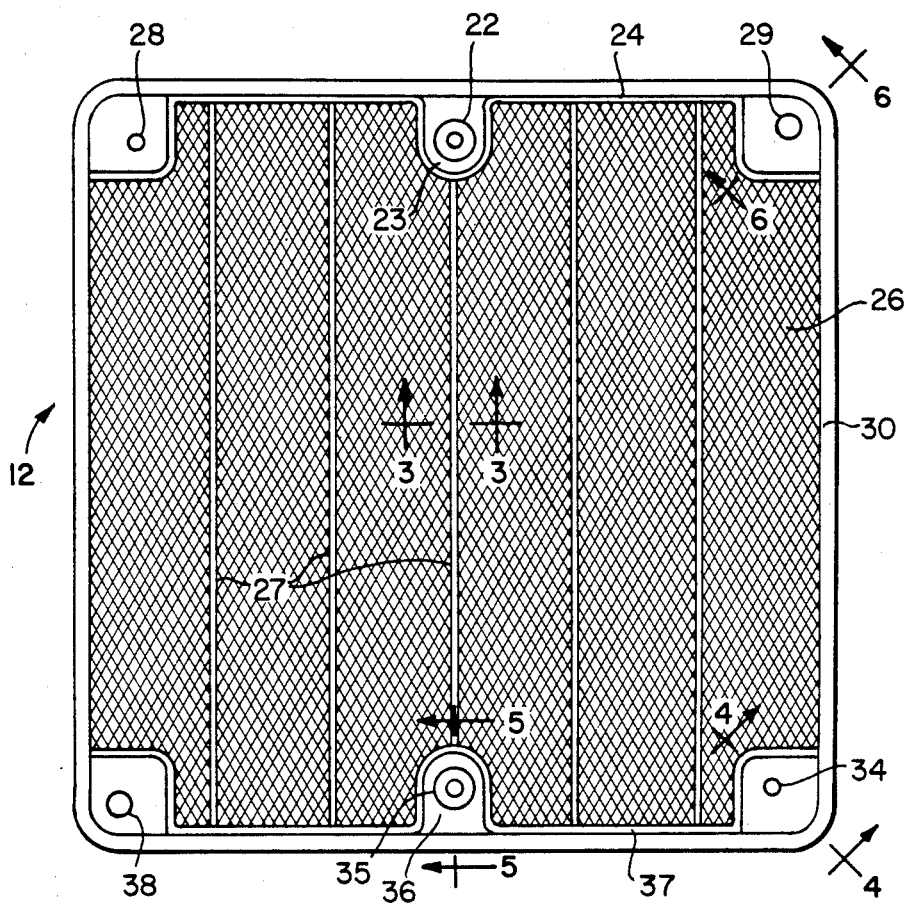
FIG. 2 is an elevation of the oxygen flow defining side of a bipolar, coolant separator.

FIG. 2 shows the oxidant or cathode side of internally cooled bipolar separator 12. Cathode flow plate 30 is preferably fabricated of commercially pure niobium and may be 5 mils thick. The anode flow plate, not shown in FIG. 2, is preferably fabricated of zirconium because of zirconiums's excellent resistance to hydrogen embrittlement, although other metals, such as niobium, may also be utilized. The resistance of niobium to hydrogen embrittlement is not as good as that of zirconium so that zirconium is preferred.

An oxygen inlet manifold 22 is located in a well 23 which communicates with oxygen distribution channel 24 which extend along the upper edge of separator 12. A plurality of ridges 27 extend along the flow field and function as blocking ribs to force oxygen flow over the surface of the cathode flow field in generally parallel paths. That is, ridges 27 are higher than flow field defining projections 26 and establish a plurality of paths for the oxidant. The projections or embossments may be hemispherical, oval or diamond shaped. The precise configuration is not critical as long as flow paths for oxygen are established over the entire electrode surface.

An oxygen outlet manifold 35 is located in a similar well 36 at the bottom of the assembly and communicates with oxygen outlet distribution channel 37 extending across the bottom of the plate. The inlet and outlet manifolds contain a plurality of passages which communicate with the central bores to permit flow of oxygen from the inlet manifold over the surface of the cathode flow field and the removal of excess oxygen and product water through outlet manifold 35.

Hydrogen inlet and outlet manifolds 28 and 34 are positioned at opposite corners of the separator to provide hydrogen fuel flow over the anode flow field side of the separator, not shown.

When very pure hydrogen is utilized, the hydrogen outlet manifold may be dispensed with since there is virtually no accumulation of inerts that need to be purged. The inlet to the hydrogen gas manifolds of the battery, not shown, is controlled by a pressure demand valve which is actuated to supply more hydrogen as hydrogen is consumed in the cells.

Figure 6:
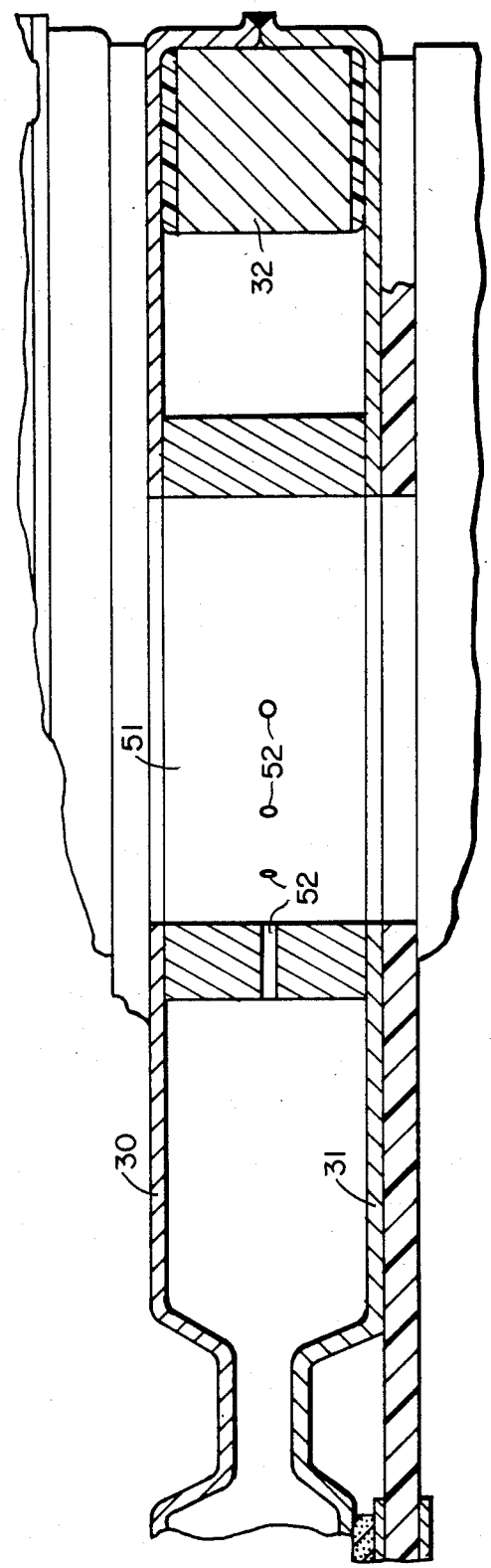
FIG. 6 is a sectional view taken along lines 6—6 of FIG. 2 through the coolant inlet.

Coolant inlet and outlet manifolds 29 and 38 communicate, as may be seen more clearly seen in FIG. 6, with the interior coolant cavity which contains coolant flow field insert 33.

Figure 3:
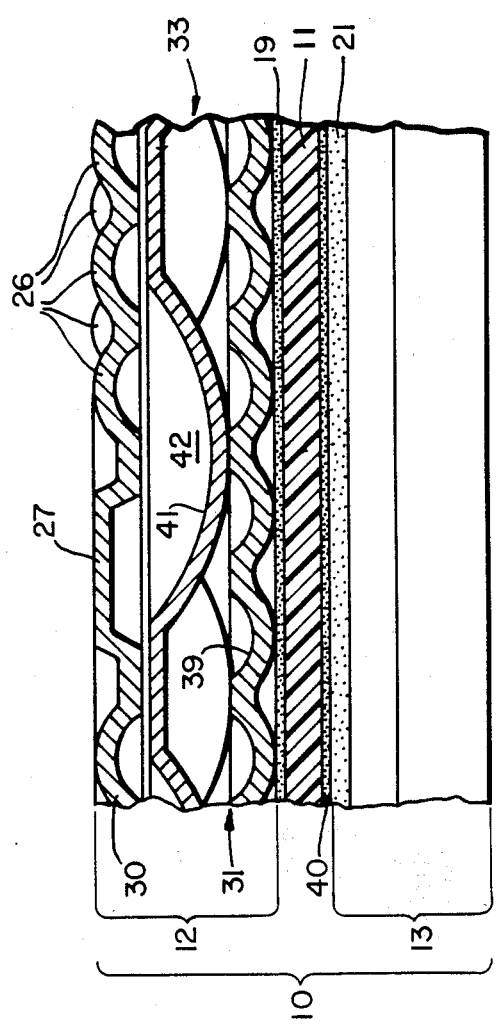
FIG. 3 is a sectional view taken along lines 3—3 of FIG. 2 showing the coolant chamber and coolant flow insert.

FIG. 3, which is a sectional view taken along the lines 3—3 of FIG. 2, shows a portion of bi-polar separators 12 and 13 and of membrane 11 which is positioned between them to form fuel cell 10. Cathode and anode plates 30 and 31 of separator 12 define the interior coolant chamber 42 which retains a dimpled, titanium coolant flow field insert 33. Projections 39 on anode plate 31 contact a carbon paper support, not shown, which is placed directly against anode electrode 19 bonded to one surface of membrane 11. Projections 26 on cathode plate 30 of separator 12 contacts the porous, wet-proofed graphite sheet 21 which directly contacts cathode 40 bonded to the other side of membrane 11.

Coolant flow field insert 33 is preferably formed of titanium and includes a plurality of hemispherical projections 41 which define the coolant flow along opposite side of the separtion. The hollow side of the spherical projections tends to collect water so that flow along that side is more static than along the other side of the projections. As a result there is a difference in the degree of cooling on opposite sides of the assembly. The coolant flow insert is not fixed to the chamber frame but is loosely retained between the anode and cathode flow field plates.

The various flow distribution plates, as pointed out previously, are formed from embossed 5 mil thick zirconium, niobium and titanium sheet stock. The depth of the various dimples and spacing are obviously a function of the desired flow rate and mass flow for the various reactants and coolants. Thus, the projections in the anode and cathode distribution plates may, for example have an 80 mil spacing and be 10 mils deep. The coolant flow distribution plate, on the other hand, has a depth of 30 mils and a 250 mil spacing simply because the mass transfer of coolant is much greater than that of the reactant gases. As may be seen, the projections are in offset rows with the precise spacing being determined by the desirable flow pattern for the fluids. It will be obvious to the man skilled in the art that heighth, spacing, and shape of these dimples maybe varied to achieve the desired flow pattern both on the surface and internally of the bipolar separator cartridge and that the shape need not be hemispherical.

Figure 4:
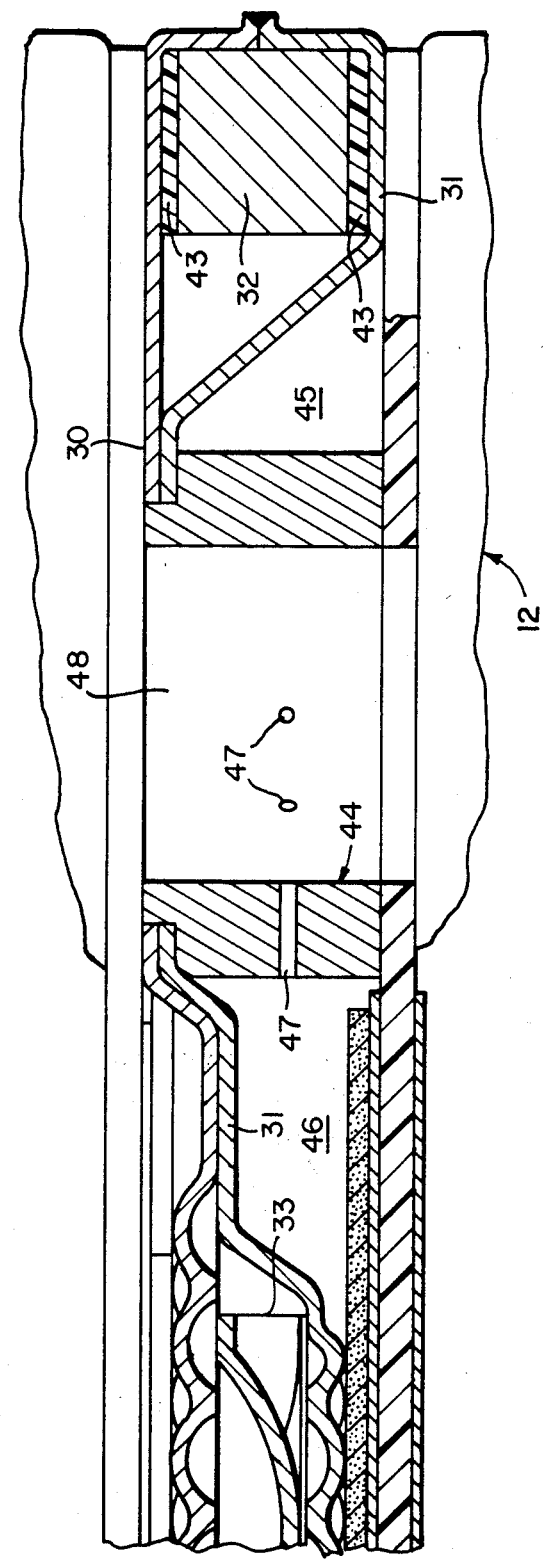
FIG. 4 is a sectional view taken along lines 4—4 of FIG. 2 through the hydrogen inlet manifold.

FIG. 4 is a sectional view through the fuel gas supply manifold through which hydrogen is introduced to the anode chamber formed by the membrane and one plate of the bipolar separator. Cathode and anode flow distribution plates 30 and 31 extend over polysulfone frame 32 and are edge welded. Frame 32 and the metallic flow distribution plates are separated by Teflon silicone gaskets 43 positioned over the upper and lower surfaces of the frame. The top of hydrogen supply manifold button 44 is flush with cathode plate 30. The plate together with peripheral portions of the cell membrane and a silicone adhesive over the periphery form a leakproof seal to prevent leakage of hydrogen into the cathode chamber. On the anode plate side a well or depression 45 communicates with distribution channel 46 extending along the top of the anode flow distribution plate in a manner similar to the oxygen distribution channel shown in FIG. 1. The manifold button extends into well 45 and has a plurality of lateral passages 47 which communicate with a central bore 48. Hydrogen flows through pasages 47 into well 45 and into hydrogen distribution channel 46 which extend across the top of the anode flow plate so that the hydrogen is distributed evenly over the anode flow plate surface.

The hydrogen outlet manifold is of a similar construction in that excess hydrogen flows into a horizontal hydrogen distribution channel which is horizontally disposed along the bottom of the flow field and then into an outlet manifold situated in a well. Horizontal passages in the outlet manifold to allow passage of the remaining hydrogen out of the cell. However, as pointed out previously, if pure hydrogen is used as the fuel so that there is a low concentration of inerts the outlet manifold may be dispensed with.

Figure 5:
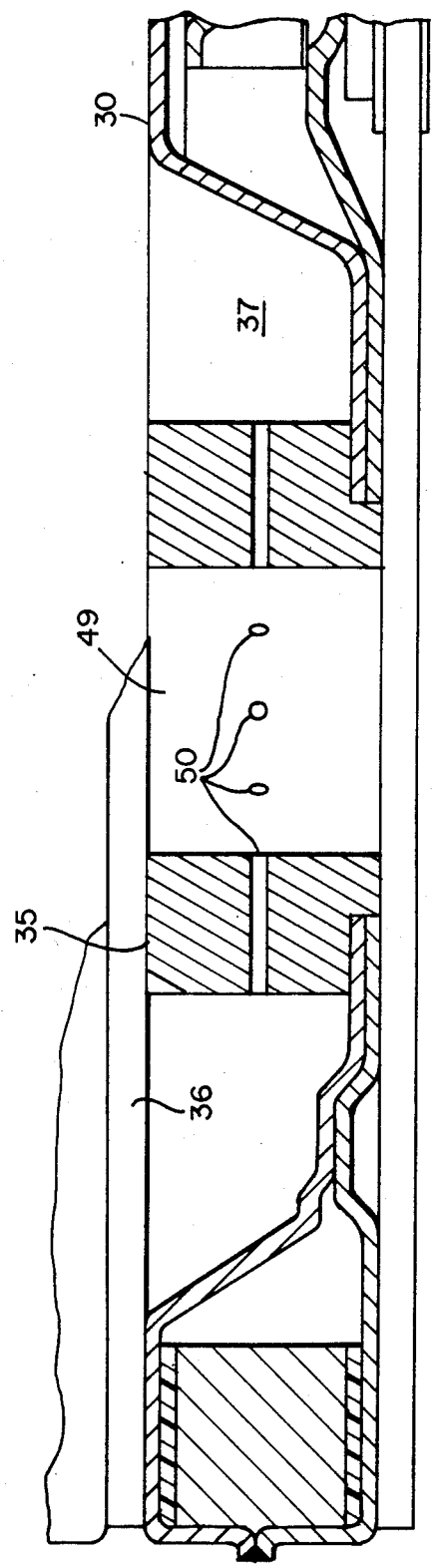
FIG. 5 is a sectional view taken along lines 5—5 of FIG. 2 through the oxygen outlet manifold.

FIG. 5 shows a sectional view of the separator and the oxygen outlet manifold. It is understood that the construction of the oxygen inlet and outlet manifolds are identical. The cylindrical manifold, is positioned in a well 36 and communicates with an oxidant collection channel 37 extending horizontally along the bottom of the cathode flow distribution plate. A central bore 49 in the manifold communicates with well 36 through a plurality of passages 50 so that excess oxygen and product water passes into the bore and out of the cell. Manifold 35 is flush with the anode flow field distributor surface so that when the cell is assembled and the membrane periphry is attached to the frame with a silicone adhesive, no oxygen or product water can escape into the anode cavity.

FIG. 6 shows a sectional view of the water inlet manifold 29 which communicates with the interior coolant chamber. The manifold has a central bore 51 and a plurality of passages 52 which communicate with the interior of the chamber formed by frame 32, and cathode and anode flow distribution plates 30 and 31. Coolant flow distribution plate 31 (not shown) is retained between plates 30 and 31 and controls coolant flow to produce differential cooling on opposite sides of the separator. The water outlet manifold construction is identical to that of the water inlet manifold at the opposite corner of the bipolar, separator coolant.

In summary, a novel battery arrangement is provided which utilizes a plurality of internally cooled, bipolar, reactant flow distribution and separator elements positioned between electrodes attached to the membranes of adjacent fuel cells. Coolant flowing through the bipolar separator establishes a temperature differential on opposite sides thereof which in turn establishes a temperature differential between the anode and cathode electrodes of individual fuel cells so that the anode electrode at which the fuel/hydrogen reactant is consumed is cooler than the cathode water/oxidant electrode. As a result, back diffusion of water from the cathode to the anode side minimizes drying of the hydrogen side of the membrane because of removal of water of hydration by the proton flux. This unique arrangement has been found to be very effective in allowing a high packaging density of cells and bipolar elements as well as optimizing operation of the cell by minimizing drying of the hydrogen side of the membrane.

While the instant invention has been shown in connection with certain preferred embodiments thereof, the invention is by no means limited thereto since other modifications of the instrumentalities employed and of the steps of the process carried out may be made and fall within the scope of the invention. It is contemplated by the appended claims to cover any such modifications that fall within the true scope and spirit of this invention.

What is claimed as new and desired to be secured by a Letter of Patent of the United States is:

1. An electrically conductive bipolar separator element for electrochemical cells comprising a nonperforated electrically conductive wall members having projections theron for contacting electrodes of said cells, said wall members defining an interior coolant chamber for said separator,
    (a) means for communicating with the interior of said chamber to permit introduction and removal of coolant,
    (b) means positioned in said interior chamber to produce differential coolant flow rates along walls of said chamber to produce differential cooling of said bipolar separator.

2. A fuel cell battery comprising at least two adjoining fuel cells of the type including a membrane having anodes and cathodes in intimate electrical contact therewith,
    (a) means to supply fuel and oxidant gases to the anode and cathode electrodes of each cell,
    (b) means to maintain the temperature of the anode side of the membrane lower than the cathode side to minimize anode side drying, including differentially cooled electrically conductive bipolar nonperforated separators positioned between electrodes of adjacent cells and having projections contacting said electrodes, the cooler side of said bipolar separator contacting the anode in contact with the membrane of one cell and the other side contacting the cathode of the adjacent cell whereby a temperature differential is established across each membrane, wherein the separators having projections on one side and depressions on the other.

* * * * *